United States Patent
Morino et al.

(10) Patent No.: US 12,429,913 B2
(45) Date of Patent: Sep. 30, 2025

(54) ELECTRONIC APPARATUS

(71) Applicant: Lenovo (Singapore) Pte. Ltd., Singapore (SG)

(72) Inventors: Takayuki Morino, Kanagawa (JP); Daisuke Takahashi, Kanagawa (JP); Takehito Yamauchi, Kanagawa (JP); Yalu Liu, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 240 days.

(21) Appl. No.: 18/170,469

(22) Filed: Feb. 16, 2023

(65) Prior Publication Data
US 2023/0288960 A1  Sep. 14, 2023

(30) Foreign Application Priority Data
Mar. 11, 2022  (JP) .................... 2022-038243

(51) Int. Cl.
*G06F 1/16* (2006.01)
*F16C 11/04* (2006.01)

(52) U.S. Cl.
CPC ............ *G06F 1/1641* (2013.01); *F16C 11/04* (2013.01); *G06F 1/1681* (2013.01)

(58) Field of Classification Search
CPC .... G06F 1/1641; G06F 1/1681; G06F 1/1616; G06F 1/1652; F16C 11/04
See application file for complete search history.

(56) References Cited

U.S. PATENT DOCUMENTS

| | | | |
|---|---|---|---|
| 10,480,225 B1* | 11/2019 | Hsu | G06F 1/1616 |
| 2020/0275563 A1* | 8/2020 | Watamura | E05D 3/14 |
| 2021/0125527 A1* | 4/2021 | Ni | G09F 9/301 |
| 2023/0225066 A1* | 7/2023 | Park | G06F 1/1698 |
| | | | 361/807 |

FOREIGN PATENT DOCUMENTS

| | | |
|---|---|---|
| JP | 6453413 B1 | 1/2019 |
| JP | 2020119304 A | 8/2020 |
| JP | 2020125841 A | 8/2020 |
| JP | 2020135790 A | 8/2020 |
| JP | 2020159429 A | 10/2020 |
| JP | 2020184355 A | 11/2020 |
| JP | 2021196760 A | 12/2021 |

* cited by examiner

*Primary Examiner* — Allen L Parker
*Assistant Examiner* — Peter Krim
(74) *Attorney, Agent, or Firm* — Osha Bergman Watanabe & Burton LLP (57) ABSTRACT

An electronic apparatus includes: a first chassis which has a first frame member; a second chassis which has a second frame member which is adjacent to the first frame member and is adjacent to the first chassis; a display which is supported to the first chassis and the second chassis; and a hinge device which so connects the first chassis and the second chassis as to be rotationally movable relative to each other between a first posture that the first chassis and the second chassis are so folded as to mutually overlap in a surface normal direction and a second posture that the first chassis and the second chassis are mutually arrayed in a direction which is vertical to the surface normal direction.

5 Claims, 6 Drawing Sheets

ELECTRONIC APPARATUS

CROSS-REFERENCE TO RELATED APPLICATIONS

This application claims priority to Japanese Patent Application No. 2022-038243 filed on Mar. 11, 2022, the contents of which are hereby incorporated herein by reference in its entirety.

BACKGROUND

Technical Field

The present invention relates to an electronic apparatus which connects a plurality of chassis via a hinge device.

Description of Related Art

In recent years, the use of an electronic apparatus such as a PC (personal computer), a smartphone and so forth of the type of having a touch-panel-system liquid crystal display and not having a physical keyboard is rapidly spreading. It is desirable that the display of the electronic equipment of the above-mentioned type is large when used and, on the other hand, it is also desired that the display be made compact when not used. Accordingly, an electronic apparatus which is configured that not only a chassis but also the display is made foldable by using a flexible display such as an organic EL (Electro Luminescence) display and so forth is proposed (see Japanese Patent No. 6453413).

The above-described electronic apparatus includes a back cover component which is exposed to the outside in a state that the chassis are mutually folded and is housed in the chassis in a state that the chassis are mutually opened. Accordingly, in a frame member which configures the left and right chassis, an end which faces the back cover component is formed by using one thin metal plate and thereby to suppress the thickness of the entire of the chassis which includes the back cover component.

However, since the frame member is formed by using the thin metal plate, it has been found that in a case where the chassis are mutually folded, there is a possibility that curvature deformation which directs in a direction that the frame member is separated from the back cover component will be induced. That is, it is feared that the left and right frame members may be deformed to be opened in a state of sandwiching the back cover component therebetween and may spoil the outer appearance quality of the electronic apparatus. Incidentally, the problem of occurrence of the opening of the frame members similarly occurs also in a folding-type electronic apparatus which does not use the flexible display.

SUMMARY

The present invention has been made in consideration of the problem of the above-described prior art and aims to provide an electronic apparatus which makes it possible to suppress deformation of the chassis and to suppress deterioration of the outer appearance quality.

An electronic apparatus pertaining to a first aspect of the present invention includes a first chassis which has a first frame member, a second chassis which has a second frame member which is adjacent to the first frame member and is adjacent to the first chassis, a display which is supported to the first chassis and the second chassis, a hinge device which so connects the first chassis and the second chassis as to be rotationally movable relative to each other between a first posture that the first chassis and the second chassis are so folded as to mutually overlap in a surface normal direction and a second posture that the first chassis and the second chassis are mutually arrayed in a direction which is vertical to the surface normal direction, a back cover component which extends along a first edge of the first frame member which is adjacent to the second frame member and a second edge of the second frame member which is adjacent to the first frame member and is so arranged as to close a gap which is formed between mutual inner faces of the first edge and the second edge at the time of taking the first posture and is so arranged as to stride over the first edge and the second edge at the time of taking the second posture, a first plate which is fixed together with the first frame member and supports the display with its front face and a second plate which is fixed together with the second frame member and supports the display with its front face, in which the first edge of the first frame member is fixed together with the first plate and the second edge of the second frame member is fixed together with the second plate.

According to the above-described aspect of the present invention, it becomes possible to suppress the deformation of the chassis and to suppress the deterioration of the outer appearance quality.

DETAILED DESCRIPTION

In the following, an electronic apparatus pertaining to the present invention will be described in detail by giving a preferred embodiment, while referring to the appended drawings.

Figure 1:
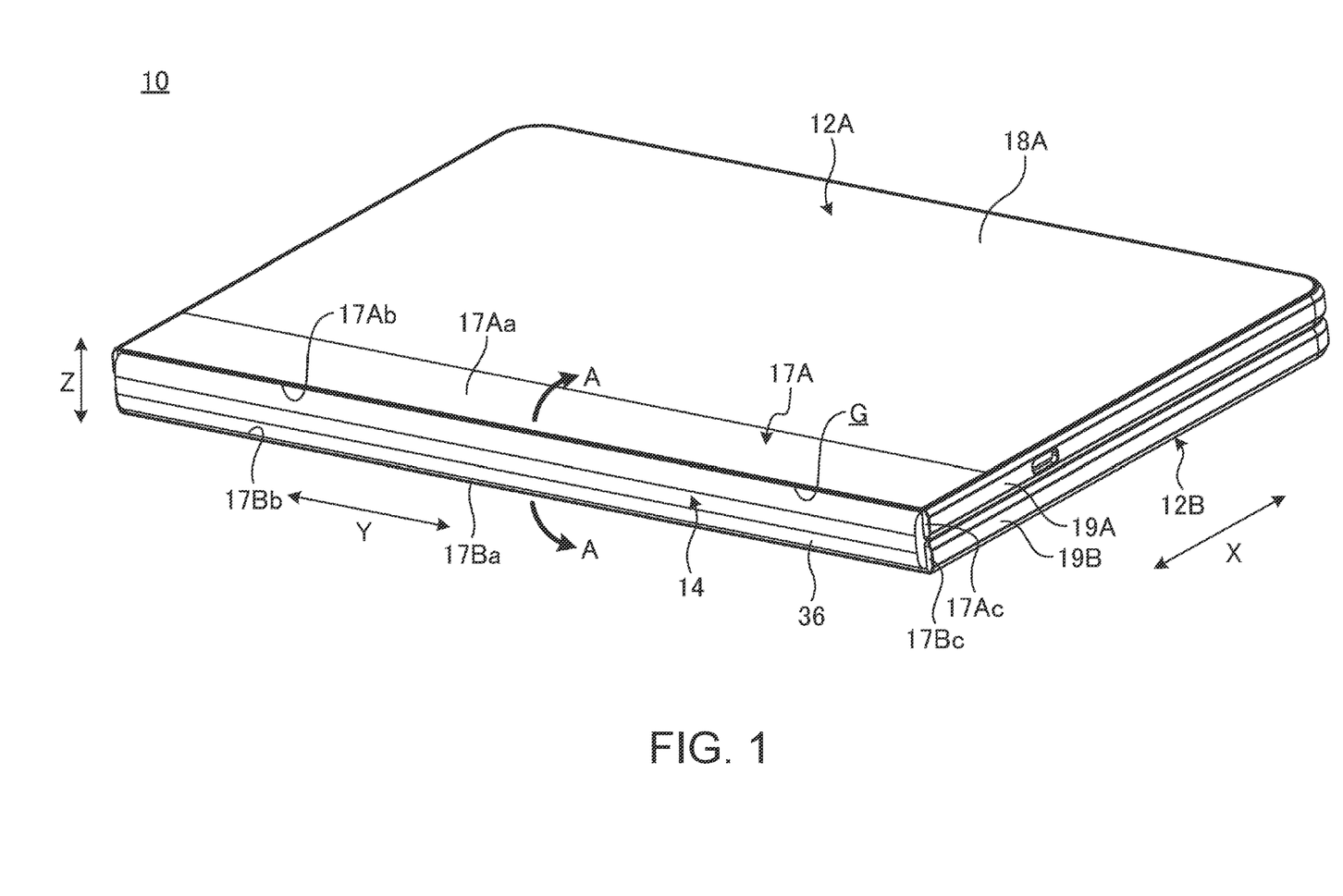
FIG. 1 is a perspective view schematically illustrating one example of a state that an electronic apparatus according to one embodiment of the present invention is closed and is brought into a 0-degree posture.
Figure 2:
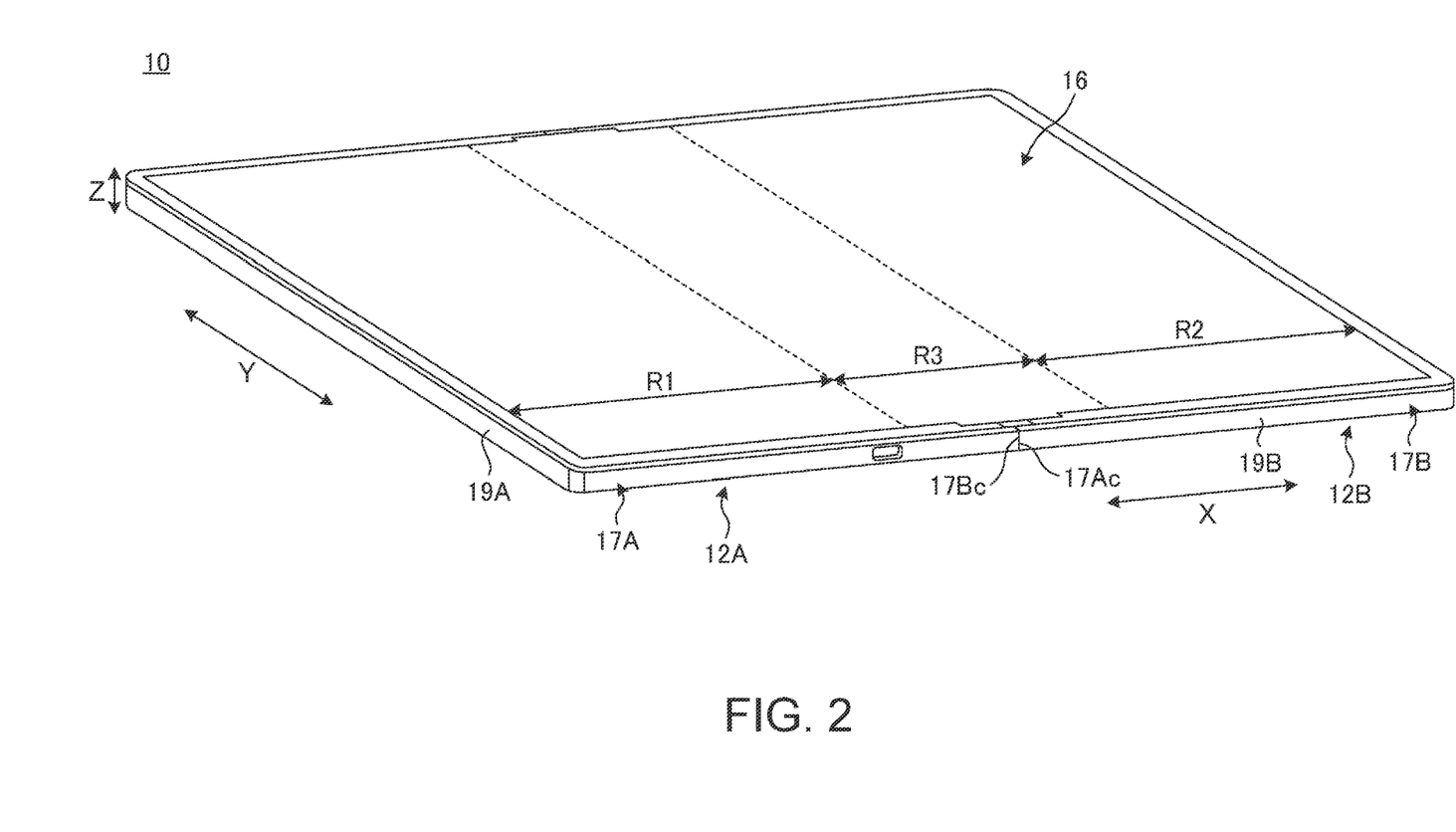
FIG. 2 is a perspective view schematically illustrating one example of a state that the electronic apparatus which is illustrated in FIG. 1 is opened and is brought into a 180-degree posture.
Figure 3:
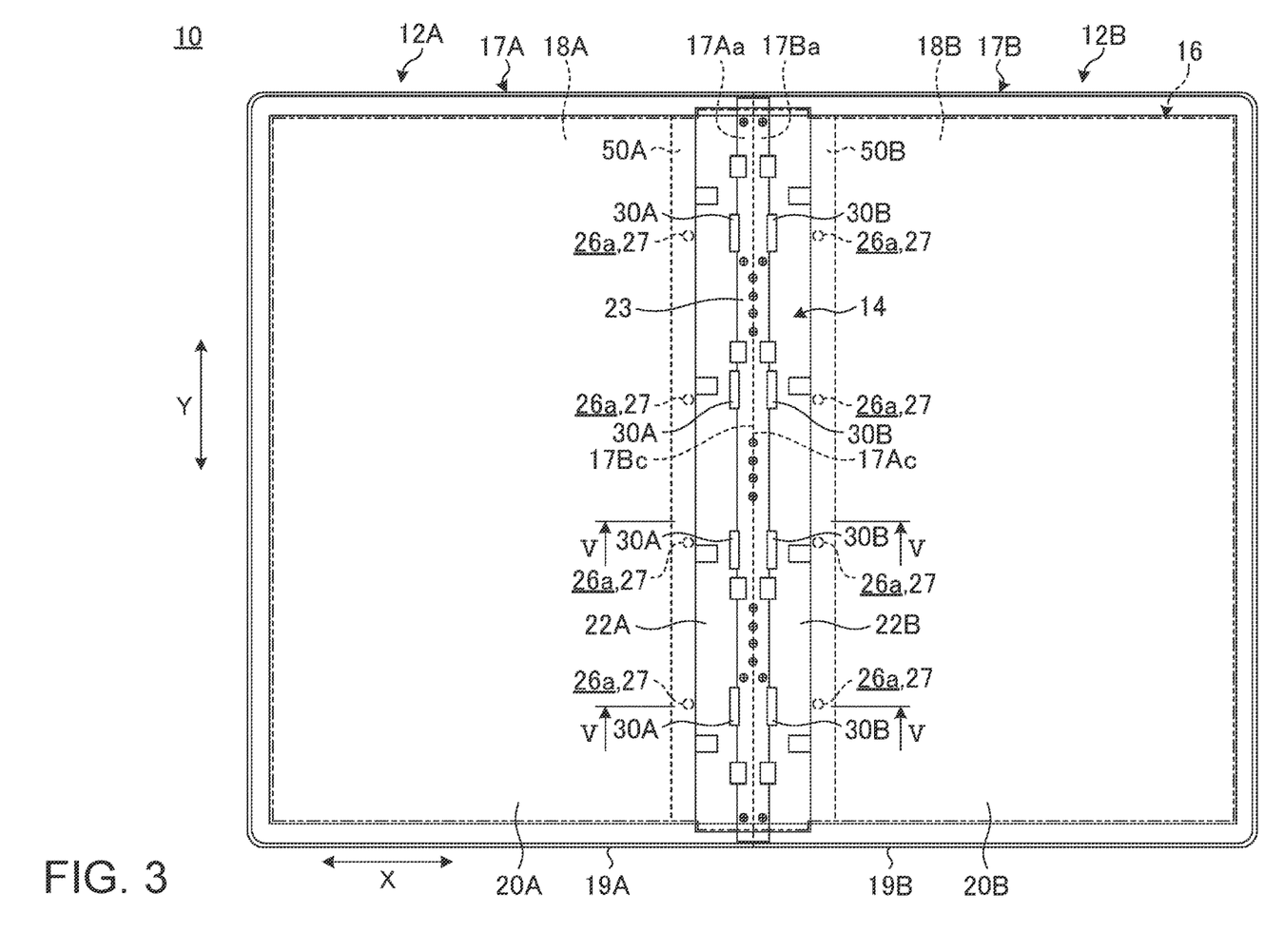
FIG. 3 is a plan view schematically illustrating one example of an internal structure of the electronic apparatus which is illustrated in FIG. 2.

FIG. 1 is a perspective view schematically illustrating one example of a state that the electronic apparatus 10 according to one embodiment of the present invention is closed and brought into the 0-degree posture. FIG. 2 is a perspective view schematically illustrating one example of a state that the electronic apparatus 10 which is illustrated in FIG. 1 is opened and brought into the 180-degree posture. FIG. 3 is a plan view schematically illustrating one example of the internal structure of the electronic apparatus 10 which is illustrated in FIG. 2.

As illustrated in FIG. 1 to FIG. 3, the electronic apparatus 10 includes a first chassis 12A and a second chassis 12B, a hinge device 14 and a display 16. The electronic apparatus 10 according to one embodiment exemplifies a tablet-type PC (Personal Computer) or a Laptop PC which is made foldable just like a book. The electronic equipment 10 may be a smartphone, a portable gaming machine and so forth.

The respective chassis 12A and 12B are arranged in a mutually adjacent state. The first chassis 12A includes a first frame member 17A and a first cover member 18A. The first frame member 17A is a rectangular frame-shaped member that vertical walls 19A are formed on three sides, other than one side that a first edge 17Aa which is adjacent to the second chassis 12B is formed. The first cover member 18A is a plate-shaped member which closes a rear-face opening in the first frame member 17A (also see FIG. 5). Likewise, the second chassis 12B includes a second frame member 17B that vertical walls 19B are formed on three sides, other than one side that a second edge 17Ba which are adjacent to the first chassis 12A is formed and a second cover member 18B which closes a rear-face opening in the second frame member 17B. Front-face openings in the frame members 17A and 17B are closed with the display 16.

Each of the members 17A, 17B, 18A and 18B is configured by a metal member which is made of, for example, stainless steel, magnesium, aluminum and so forth, a fiber-reinforced resin plate which contains reinforced fibers such as carbon fibers and other fibers and so forth.

In one embodiment of the present invention, the frame members 17A and 17B are made of an aluminum alloy and the cover members 18A and 18B are made of a magnesium alloy.

The hinge device 14 connects the chassis 12A and 12B to be rotationally movable relative to each other. The hinge device 14 also functions as a back cover which hides a gap G between the adjacent ends 17Aa and 17Ba which is formed in the 0-degree posture which is illustrated in FIG. 1. The display 16 extends ranging from the chassis 12A to the chassis 12B.

In the following, the electronic apparatus 10 will be described by calling, when the electronic apparatus 10 is opened as shown in FIG. 2, a direction that the chassis 12A and the chassis 12B are arranged side by side as an X direction, a direction which is orthogonal to the X direction and is oriented along the edges 17Aa and 17Ba as a Y direction, and a thickness direction of the chassis 12A and 12B as a Z direction, respectively. In addition, angular postures between the chassis 12A and 12B will be described by calling a state that the chassis 12A and 12B are folded to mutually overlap in a surface normal direction (i.e., direction of the surface normal with respect to the extending planes of the chassis 12A and 12B) as the 0-degree posture (see FIG. 1) and calling a state that the chassis 12A and 12B are mutually arrayed side by side in a direction (the X direction) which is vertical to the surface normal direction as the 180-degree posture (see FIG. 2). It is possible to call each posture that the chassis 12A and 12B take between the 0 degree and 180 degrees by appropriately marking each angle. For example, a state that mutual surface normal directions of the chassis 12A and 12B are orthogonal to each other exhibits a 90-degree posture. The above-described degrees of angles are picked up for the convenience of description and such a situation that in an actual product, an angular position thereof slightly deviates from an accurate angular position that an angle value indicates would naturally occur.

Figure 4:
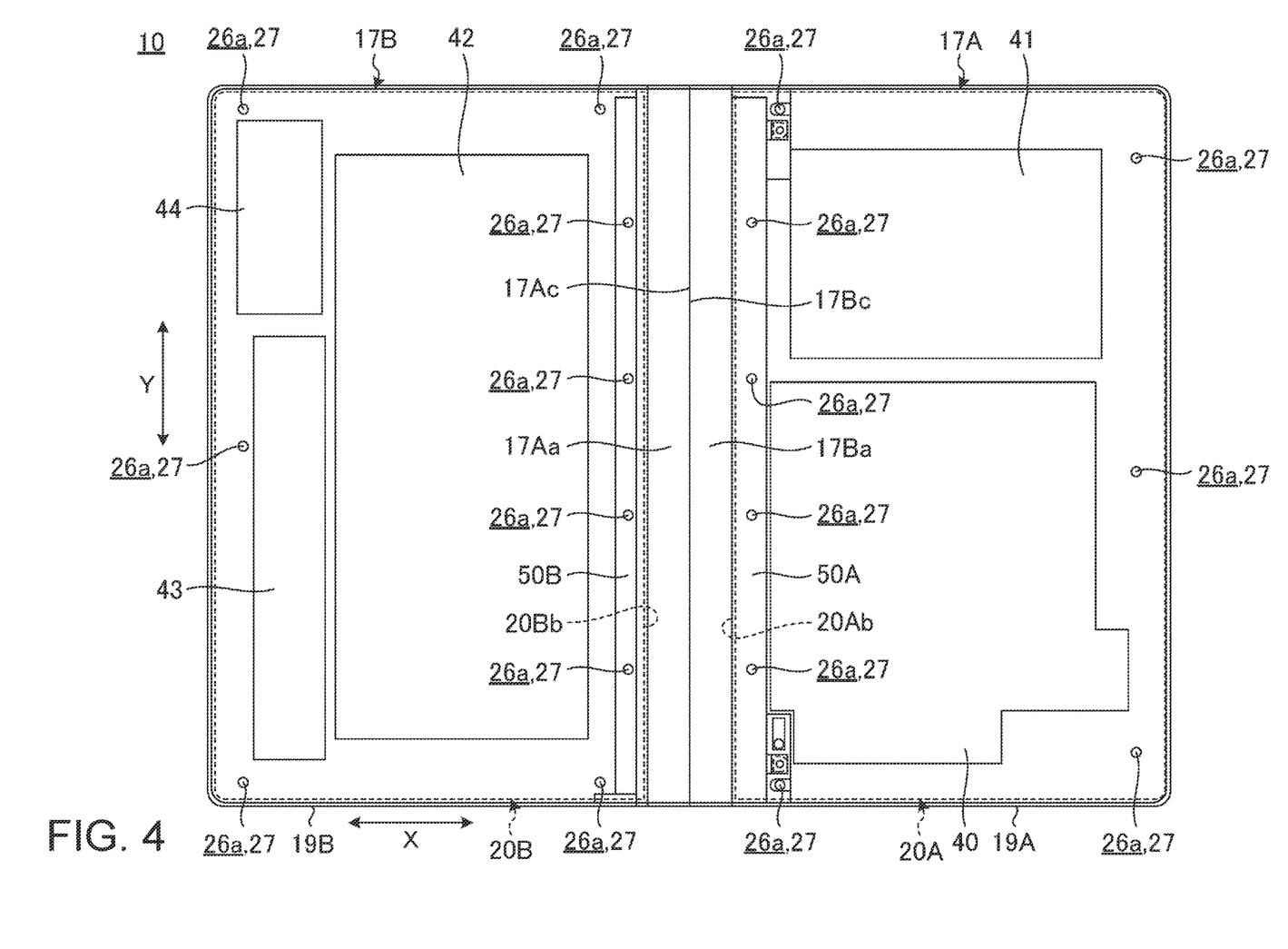
FIG. 4 is a bottom diagram schematically illustrating one example of the internal structure of the electronic apparatus which is illustrated in FIG. 3.
Figure 5:
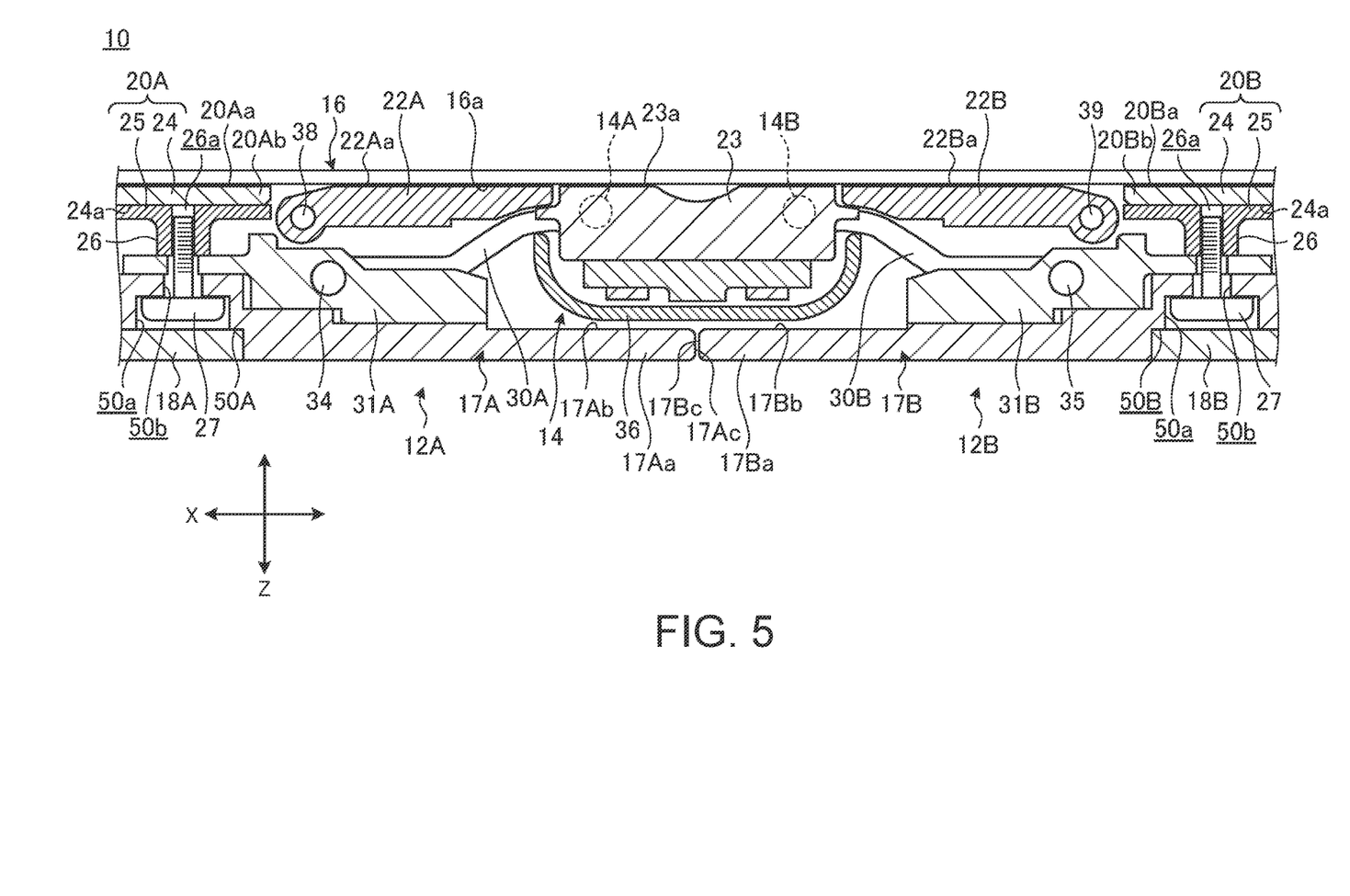
FIG. 5 is a schematic sectional diagram taken along the V-V line in FIG. 3.
Figure 6:
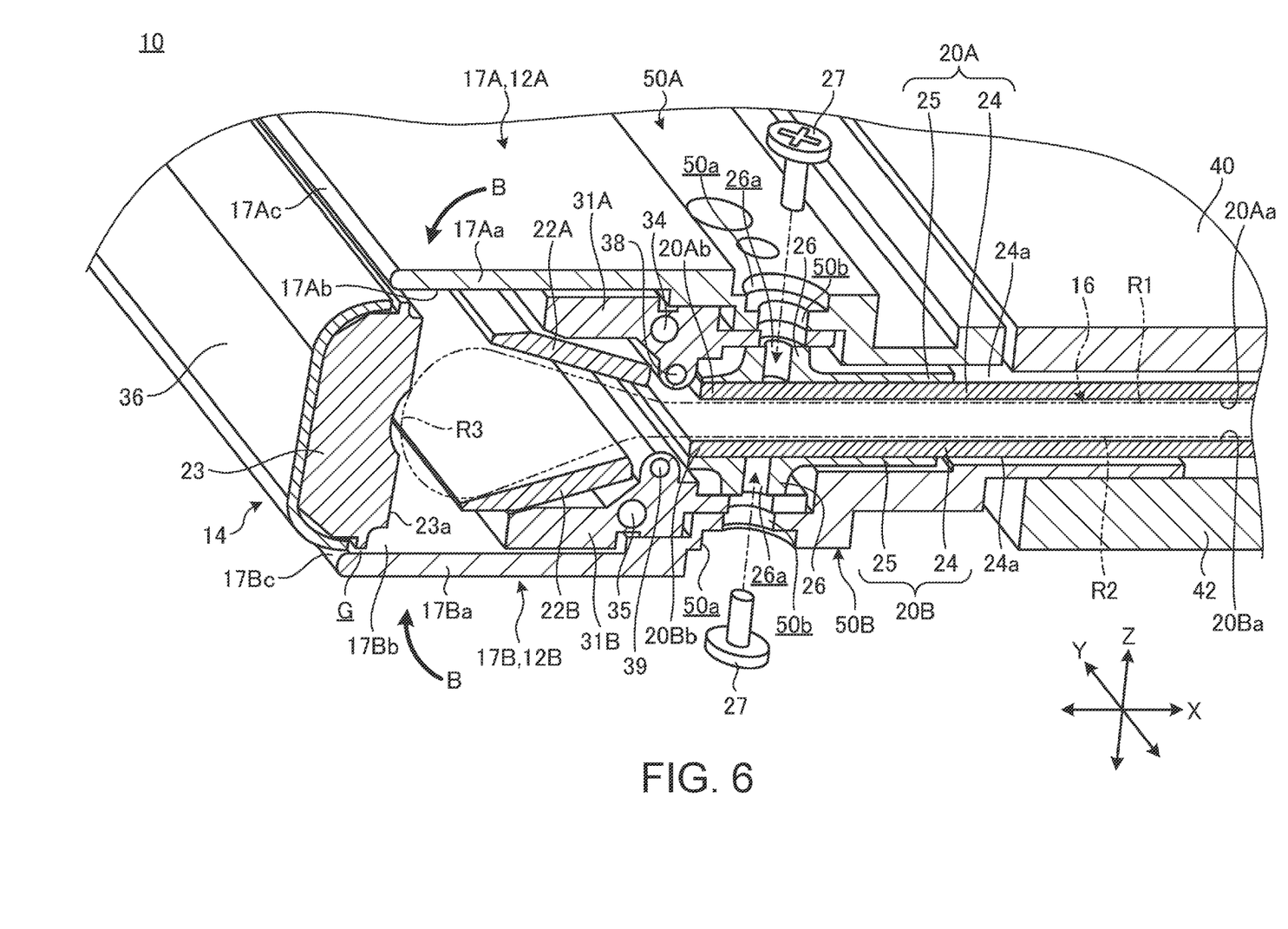
FIG. 6 is a schematic perspective sectional diagram illustrating one example of a state that the electronic equipment which is illustrated in FIG. 5 is brought into the 0-degree posture.

FIG. 4 is a bottom diagram schematically illustrating one example of the internal structure of the electronic apparatus 10 which is illustrated in FIG. 3. FIG. 4 is the diagram illustrating one example of a state that the chassis 12A and 12B from which the cover members 18A and 18B are removed respectively are viewed from the side of the bottom face. FIG. 5 is a schematic sectional diagram which is taken along the V-V line in FIG. 3. FIG. 6 is a schematic perspective sectional diagram illustrating one example of a state that the electronic apparatus 10 which is illustrated in FIG. 5 is brought into the 0-degree posture.

In the 0-degree posture which is illustrated in FIG. 1 and FIG. 6, the chassis 12A and 12B are brought into a state of being folded in two. The display 16 is a paper-like flexile display which is made of the organic EL. At the time of taking the 0-degree posture, the display 16 enters a state that a region R1 on the first chassis 12A side and a region R2 on the second chassis 12B side which are illustrated in FIG. 2 are arranged to mutually confront and a folding region R3 which is a boundary region between the regions R1 and R2 is folded in an arc. In the 180-degree posture which is illustrated in FIG. 2 and FIG. 5, the chassis 12A and the chassis 12B are mutually arranged side by side in a crosswise direction. In this case, the regions R1 and R2 and the folding region R3 are arranged side by side on an XY plane and the display 16 exhibits a planar shape, as a whole.

In the display 16, the first region R1 is fixed relative to the first chassis 12A and the second region R2 is fixed relative to the second chassis 12B. Specifically, a rear face 16a of the display 16 in the first region R1 is fixed to the first chassis 12A via a first plate 20A and the rear face 16a of the display 16 in the region R2 is fixed to the second chassis 12B via a second plate 20B. The folding region R3 of the display 16 is supported by a first support plate 22A, a hinge main body 23 and a second support plate 22B which configure the hinge device 14.

As illustrated in FIG. 3 to FIG. 6, the plates 20A and 20B are so arranged on the left and right sides as to sandwich the hinge device 14 therebetween and support the rear face 16a of the display 16 with their front faces 20Aa and 20Ba respectively. On the rear face 16a of the display 16, the first region R1 is adhesively fixed to the front face 20Aa of the first plate 20A and the second region R2 is adhesively fixed to the front face 20Ba of the second plate 20B.

Each of the plates 20A and 20B is configured by a base plate 24 and a metal frame 25. The base plate 24 is, for example, a carbon fiber reinforced resin plate that carbon fibers are impregnated with a matrix resin such as an epoxy resin and so forth. The metal frame 25 is made of, for example, a magnesium alloy and so forth and is fixed to an outer peripheral edge of a rear face 24a of the base plate 24. Since the plates 20A and 20B are carbon fiber reinforced resin plates, ensuring of a high flatness, thinning and right-weighting of the plates 20A and 20B are possible. However, regarding the carbon fiber reinforced resin plate, it is feared that the carbon fibers might fall off an outer peripheral end face (edge) as if powder is blown out and profiling, threading and so forth of the carbon fiber reinforced resin plate are difficult. Accordingly, in each of the plates 20A and 20B, the metal frame 25 is so fixed with an adhesive and so forth as to surround outer edges of the outer peripheral end face and the rear face 24a of the base plate 24.

A plurality of bosses 26 is formed on the metal frame 25 of the first plate 20A. The respective bosses 26 are so installed as to protrude from the rear face 24a of the base plate 24 and are arrayed side by side along an outer peripheral edge of the first plate 20A. The respective bosses 26 protrude from the rear face 24a of the base plate 24. A screw hole 26a that a female screw is formed in its inner peripheral face is formed in each boss 26. A screw 27 is threaded into the screw hole 26a. The screw 27 is adapted to clap and fix together the first plate 20A and the first frame member 17A. Another plurality of the bosses 26 in which the screw holes 26a are formed is also installed on the metal frame 25 of the second plate 20B. Then, the second plate 20B and the second frame member 17B are clamped and fixed together with the screws 27 by using the screw holes 26a.

The base plate 24 may be made of a metal material and a resin material, in place of being formed as the carbon fiber reinforced resin plate. In this case, installation of the metal frame 25 may be omitted and the screw hole 26a may be formed in the base plate 24.

The folding region R3 of the display 16 is made to be movable relative to the chassis 12A and 12B as illustrated in FIG. 5 and FIG. 6. At the time of taking the 180-degree posture, the rear face 16a of the display 16 in the folding region R3 is supported by the hinge main body 23 and the support plates 22A and 22B. At the time of taking the 0-degree posture, the folding region R3 is folded in the arc, a part of the rear face 16a of the display 16 is supported by the support plates 22A and 22B and most of the rear face 16a of the display 16 is separated from the hinge device 14.

As illustrated in FIG. 3, FIG. 5 and FIG. 6, the hinge device 14 in one embodiment of the present invention has the hinge main body 23, the first support plate 22A and the second support plate 22B.

The hinge main body 23 is installed at a position that the hinge main body 23 strides over the edges 17Aa and 17Ba of the first frame member 17A and the second frame member 17B of the chassis 12A and 12B and extends over the almost full length in the Y direction along the edges 17Aa and 17Ba respectively. The hinge main body 23 is a block-shaped component which is made of metal materials such as aluminum and so forth. Two hinge shafts 14A and 14B which are arrayed in the X direction in the 180-degree posture are supported to the hinge main body 23.

A first end of a first link arm 30A is supported to the first hinge shaft 14A to be rotatable axially. A first end of a second link arm 30B is supported to the second hinge shaft 14B to be rotatable axially. The link arms 30A and 30B have boomerang-like curved shapes which gradually come closer to inner faces 12Ab and 12Bb of the chassis 12A and 12B respectively toward a direction that the link arms 30A and 30B are separated from the hinge shafts 14A and 14B respectively.

A second end of the first link arm 30A is connected to a first bracket 31A to be relatively rotatable by using a rotation shaft 34. The first bracket 31A is fastened to the first edge 17Aa of the first frame member 17A together with the first plate 20A by using the screw 27. A second end of the second link arm 30B is connected to a second bracket 31B to be relatively rotatable by using a rotation shaft 35. The second bracket 31B is fastened to the second edge 17Ba of the second frame member 17B together with the second plate 20B by using the screw 27.

The link arms 30A and 30B and the brackets 31A and 31B are so installed as to be arrayed plurally along the longitudinal direction (the Y direction) of the hinge main body 23 (see FIG. 3). Thereby, the hinge main body 23 connects the chassis 12A and 12B to be rotationally movable relative to each other. A gear mechanism for synchronizing mutual rotational moving operations of the chassis 12A and 12B, a torque mechanism for applying a predetermined rotational movement torque to the mutual rotational moving operations of the chassis 12A and 12B and so forth are also installed in the hinge main body 23.

A back cover component 36 which functions as a decorative cover is attached to an outer face of the hinge main body 23. The back cover component 36 is a metal plate of an almost U-shape which conforms to an outer face shape of the hinge main body 23.

At the time of taking the 180-degree posture which is illustrated in FIG. 5, the hinge main body 23 supports the rear face 16a of the display 16 in the folding region R3 with its own front face 23a. On this occasion, the hinge main body 23 and the back cover component 36 are housed in the chassis 12A and 12B and are so arranged as to stride over the mutually proximate or abutting edges 17Aa and 17Ba in the X direction. At the time of taking the 0-degree posture which is illustrated in FIG. 6, the hinge main body 23 and the back cover component 36 are so arranged as to fill a gap G between inner faces 17Ab and 17Bb of the widely separated edges 17Aa and 17Ba and functions as the back cover of the electronic apparatus 10 which is folded just like a book. On this occasion, the back cover component 36 is exposed to an outermost face and thereby prevents external appearance designability of the folded electronic apparatus 10 from being deteriorated (also see FIG.

The support plates 22A and 22B are made of metal materials such as aluminum and so forth and are bisymmetric in shape. The support plates 22A and 22B are installed on the sides of the inner faces 12Ab and 12Bb of the chassis 12A and 12B respectively and extend along the edges 17Aa and 17Ba respectively over the almost full length of the electronic apparatus 10 in the Y direction.

The first support plate 22A is arranged between the first plate 20A and the hinge main body 23. In the first support plate 22A, an edge which is located on the side of the first plate 20A is connected to the first bracket 31A to be relatively rotatable via a rotating shaft 38. In the first support plate 22A, an edge which is located on the side of the hinge main body 23 is made movable relative to the hinge main body 23.

The second support plate 22B is arranged between the second plate 20B and the hinge main body 23. In the second support plate 22B, an edge which is located on the side of the second plate 20B is connected to the second bracket 31B to be relatively rotatable via a rotating shaft 39. In the second support plate 22B, an edge which is located on the side of the hinge main body 23 is made movable relative to the hinge main body 23.

The support plates 22A and 22B swing by setting the rotating shafts 38 and 39 as the centers of rotation in accordance with the rotational moving operations of the chassis 12A and 12B respectively. At the time of taking the 180-degree posture, the support plates 22A and 22B support the rear face 16a of the display 16 in the folding region R3 with their front faces 22Aa and 22Ba respectively. At the time of taking an angular posture other than the 180-degree posture, the support plates 22A and 22B come into contact with the display 16 respectively in a state of leaving the gap between the display 16 and the support plates 22A and 22B or by applying minute force of an extent of not inducing deformation of the display 16 respectively (see FIG. 6). The support plates 22A and 22B may be also configured to support the folding region R3 of the display 16 also in an angular posture other than the 180-degree posture and to correct the shape of the folding region R3 respectively. The support plates 22A and 22B stably support the folding region R3 of the display 16 with a plane in this way at the time of taking the 180-degree posture and, in addition, do not hinder the folding operation of the folding region R3 respectively.

As illustrated in FIG. 4, for example, a motherboard 40 that a CPU is implemented and a sub-battery device 41 are loaded on the first chassis 12A and further various electronic components are loaded on the first chassis 12A. For example, a main battery device 42, a display board 43 and a sub-card 44 are loaded and further various electronic components are loaded on the second chassis 12B. The display board 43 is a control substrate of the display 16. The sub-card 44 is a substrate that, for example, a power source button, external connectors which confirm to the USB (Universal Serial Bus) standard and so forth are implemented.

Incidentally, as illustrated in FIG. 5, in the electronic apparatus 10 which is configured in this way, it is preferable for the edges 17Aa and 17Ba of the respective frame members 17A and 17B to house the hinge device 14 in shallow Z-direction spaces which are formed between the inner face 17Ab of the frame member 17A and the back face of the display 16 and between the inner face 17Bb of the frame member 17A and the rear face 16a of the display 16, also including the back cover component 36.

Accordingly, it is preferable to form the edges 17Aa and 17Ba of the frame members 17A and 17B into plate shapes which are made as thin as possible. In one embodiment of the present invention, each of the edges 17Aa and 17Ba is formed by one thin aluminum-alloy plate. Specifically, although vertical walls 19A and 19B are installed on both Y-direction ends of the edges 17Aa and 17Ba, each of the frame members 17A and 17B is formed by using only one metal plate which is thin over a full length in the Y-direction.

Consequently, at the time of taking the 0-degree posture which is illustrated in FIG. 6, in the electronic apparatus 10, curvature deformation that the edges 17Aa and 17Ba of the respective frame members 17A and 17B curve in a direction which is indicated by an arrow A in FIG. 1, that is, deformation that the edges 17Aa and 17Ba so swell as to open with the back cover component 36 being sandwiched therebetween occurs and thereby it is feared that appearance quality may be deteriorated.

Accordingly, the electronic apparatus 10 according to one embodiment of the present invention has a structure which avoids occurrence of such opening deformation of the frame members 17A and 17B as above. As described above, in the electronic apparatus 10 according to one embodiment of the present invention, the first frame member 17A and the first plate 20A and the second frame member 17B and the second plate 20B are clamped together with the screws 27 respectively. In this case, as illustrated in FIG. 3 and FIG. 4, the screws 27 are also installed on the edges 17Aa and 17Ba. In particular, in one embodiment of the present invention, the screws 27 are installed at a plurality of longitudinal-direction positions on the edges 17Aa and 17Ba, for example, at four positions so as to array in the Y direction almost at equal intervals.

Accordingly, as illustrated in FIG. 4 to FIG. 6, the edges 17Aa and 17Ba of the frame members 17A and 17B are connected integrally with the plates 20A and 20B respectively with the screws 27 and thereby high rigidity is secured. In particular, in one embodiment, the edges 17Aa and 17Ba are clamped to the plates 20A and 20B with the screws 27 respectively at a plurality of positions on the edges 17Aa and 17Ba in the longitudinal direction. Accordingly, the edges 17Aa and 17Ba of the frame members 17A and 17B form box structures which are integral with the plates 20A and 20B respectively and, therefore, it becomes possible to secure higher rigidity, as a whole. As a result, at the time that the electronic apparatus 10 takes the 0-degree posture which is illustrated in FIG. 6, the edges 17Aa and 17Ba receive pressing force which acts in a direction which is indicated by an arrow B in FIG. 6 from the screws 27 and thereby occurrence of such curvature deformation that the edges 17Aa and 17Ba open is suppressed.

In particular, in one embodiment, almost the entire of each of the plates 20A and 20B is configured by the base plate 24 which is formed by an extremely hard carbon fiber reinforced resin plate. Accordingly, it becomes possible to more surely suppress occurrence of the curvature deformation of the frame members 17A and 17B by utilizing the high rigidity of the plates 20A and 20B. In addition, owing to installation of the metal frame 25 on an outer peripheral of the base plate 24 while adopting the carbon fiber reinforced resin plate, it becomes possible to readily form the screw holes 26a and the bosses 26 which are used for clamping of the screws 27.

In the electronic apparatus 10, the screw holes 26a which are used for clamping the edges 17Aa and 17Ba with the screws 27 are arrayed along the longitudinal directions of ends 20Ab and 20Bb of the plates 20A and 20B which are adjacent to the hinge device 14. Accordingly, it means that the plates 20A and 20B support the edges 17Aa and 17Ba at the shortest distance positions which are measured from ends faces 17Ac and 17Bc of the frame members 17A and 17B respectively. As a result, in the electronic apparatus 10, the effect of suppressing the deformation of the frame members 17A and 17B which is attained by the plates 20A and 20B is more increased. Here, as illustrated in FIG. 4, four points are prepared as points that the edges 17Aa and 17Ba are clamped with the screws 27 and are more than the number of points on other three sides of the frame members 17A and 17B. Specifically, left and right sides which are parallel with the edges 17Aa and 17Ba of the frame members 17A and 17B are clamped with the screws 27 at three points respectively and two sides which extends along the X-direction which is orthogonal to edges 17Aa and 17Ba are clamped with the screws 27 at two points respectively. From this fact, it would be understood that in the electronic apparatus 10, the sufficient rigidity is secured while simplifying the structure by clamping these respective sides which induce no opening at two to three points and, on the other hand, the edges 17Aa and 17Ba which induce the opening are reinforced by increasing the number of points of clamping with the screws 27.

Incidentally, in the electronic apparatus 10, in order to more effectively avoid the opening of the edges 17Aa and 17Ba, the edges 17Aa and 17Ba are clamped to the plates 20A and 20B respectively at a plurality of longitudinal-direction positions of the edges 17Aa and 17Ba. Accordingly, it is desirable to secure a screw-clamping space of the hinge device 14 which is also clamped to the edges 17Aa and 17Ba. In this respect, in the electronic apparatus 10, the brackets 31A and 31B of the hinge device 14 are fastened to the edges 17Aa and 17Ba of the frame members 17A and 17B together with the plates 20A and 20B with the screws 27. Accordingly, it becomes possible to surely secure spaces for clamping the plates 20A and 20B and the brackets 31A and 31B respectively on the narrow edges 17Aa and 17Ba.

As illustrated in FIG. 5 and FIG. 6, the frame members 17A and 17B in one embodiment have first and second level difference parts 50A and 50B at positions which are separated from the end faces 17Ac and 17Bc of the edges 17Aa and 17Ba backward by predetermined distances respectively.

Specifically, the first level difference part 50A is a part which is installed at a position which is offset from the end face 17Ac by a predetermined distance in a direction that the first level difference part 50A is separated from the second chassis 12B and is formed by recessing the first frame member 17A toward the side of the first plate 20A by one step in the Z direction. The second level difference part 50B is a part which is installed at a position which is offset from the end face 17Bc by the predetermined distance in a direction that the second level difference part 50B is separated from the first chassis 12A and is formed by recessing the second frame member 17B toward the side of the second plate 20B by one step in the Z direction.

The level difference parts 50A and 50B are parts into which the cover members 18A and 18B are fitted respectively. Accordingly, depths of the level difference parts 50A and 50B are the same as or almost the same as thicknesses of the cover members 18A and 18B respectively. In addition, the level difference parts 50A and 50B are also parts for hiding the screws 27 with the cover members 18A and 18B respectively. That is, a counterbore 50a for housing the head of each screw 27 and a hole 50b for inserting each screw 27 are formed in each bottom face of each of the level difference parts 50A and 50B. That is, the cover members 18A and 18B are fixed to the bottom faces of the level difference part 50A and 50B with screw clamps and so forth while hiding the screws 27. Incidentally, illustration of the counterbore 50a and the hole 50b is omitted in FIG. 4.

It becomes possible for the electronic apparatus 10 to hide the screws 27 for clamping together the frame members 17A and 17B and the plates 20A and 20B respectively with the cover members 18A and 18B respectively owing to provision of the level difference parts 50A and 50B in the frame members 17A and 17B respectively and to obtain higher appearance quality.

Incidentally, the present invention is not limited to the above-described embodiment and it goes without saying that it is possible to freely change the configuration within a range not deviating from the gist of the present invention.

Although, in the above description, the electronic equipment 10 which is foldable in half just like the book is exemplified, the present invention is also applicable to various configurations such as, for example, an outward-opening type configuration that a small chassis is so connected to each of left and right edges of a large chassis as to be foldable, an S-type folding configuration that chassis which are different in folding direction are connected to right and left edges of one chassis, a J-type folding configuration that a small chassis is so connected to one of left and right edges of a large chassis as to be foldable and so forth and the number of the chassis to be connected may be set to four or more.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS 10 electronic apparatus
12A first chassis
12B second chassis
14 hinge device
16 display
17A first frame member
17B second frame member
18A first cover member
18B second cover member
20A first plate
20B second plate
24 base plate
25 metal frame
31A first bracket
31B second bracket
36 back cover component
50A first level difference part
50B second level difference part

What is claimed is:

1. An electronic apparatus comprising:
a first chassis comprising a first frame member;
a second chassis adjacent to the first chassis and comprising a second frame member adjacent to the first frame member;
a display supported by the first and second chassis;
a hinge device that connects the first and second chassis to be rotationally movable relative to each other between:
a first posture in which the first and second chassis overlap in a surface normal direction that is normal to an extending plane of the first and second chassis, and
a second posture in which the first and second chassis are disposed in a direction which is vertical to the surface normal direction;
a back cover component that:
extends along:
a first edge of the first frame member adjacent to the second frame member, and
a second edge of the second frame member adjacent to the first frame member,
is configured to close a gap between inner faces of the first and second edges in the first posture, and
is configured to stride over the first and second edges in the second posture;
a first plate that supports the display on a front face of the first plate and that is fixed to the first edge at a plurality of positions in a longitudinal direction of the first edge; and
a second plate that supports the display on a front face of the second plate and that is fixed to the second edge at a plurality of positions in a longitudinal direction of the second edge, wherein
each of the first and second plates comprises:
a carbon fiber reinforced resin plate that does not have any screw holes and in which carbon fibers are impregnated with a matrix resin; and
a metal frame that has screw holes and is fixed to a rear face of the carbon fiber reinforced resin plate,
the first frame member is fixed to the first plate by screws inserted into the screw holes in the metal frame of the first plate, and
the second frame member is fixed to the second plate by screws inserted into the screw holes in the metal frame of the second plate.

2. The electronic apparatus according to claim 1, wherein the display extends over the first and second chassis and comprises a folding region folded in accordance with relative rotational movement of the first chassis with respect to the second chassis,
the first plate is disposed adjacent to a side of the hinge device toward the first chassis, the second plate is disposed adjacent to the hinge device toward the second chassis, the screw holes in the metal frame of the first plate are along an end of the first plate adjacent to the hinge device, and the screw holes in the metal frame of the second plate are along an end of the second plate adjacent to the hinge device.

3. The electronic apparatus according to claim 1, wherein the display extends over the first and second chassis and comprises:
   a folding region folded in accordance with relative rotational movement of the first chassis with respect to the second chassis;
   a first region adjacent to the folding region toward the first chassis; and
   a second region adjacent to the folding region toward the second chassis,
the folding region is supported by the hinge device,
the first region is fixed to a front face of the first plate, and
the second region is fixed to a front face of the second plate.

4. An electronic apparatus comprising:
a first chassis comprising a first frame member;
a second chassis adjacent to the first chassis and comprising a second frame member adjacent to the first frame member;
a display supported by the first and second chassis;
a hinge device that connects the first and second chassis to be rotationally movable relative to each other between:
   a first posture in which the first and second chassis overlap in a surface normal direction that is normal to an extending plane of the first and second chassis, and
   a second posture in which the first and second chassis are disposed in a direction which is vertical to the surface normal direction;
a back cover component that:
   extends along:
      a first edge of the first frame member adjacent to the second frame member, and
      a second edge of the second frame member adjacent to the first frame member,
   is configured to close a gap between inner faces of the first and second edges in the first posture, and
   is configured to stride over the first and second edges in the second posture;
a first plate that supports the display on a front face of the first plate and that is fixed to the first edge at a plurality of positions in a longitudinal direction of the first edge; and
a second plate that supports the display on a front face of the second plate and that is fixed to the second edge at a plurality positions in a longitudinal direction of the second edge, wherein the first frame member comprises a first level difference part recessed toward the first plate apart from an end face of the first edge and that has holes for inserting screws for fixing the first frame member to the first plate, the second frame member comprises a second level difference part recessed toward the second plate apart from an end face of the second edge and that has holes for inserting screws for fixing the second frame member to the second plate, the first chassis further comprises a first cover member that covers the first level difference part, and the second chassis further comprises a second cover member that covers the second level difference part.

5. An electronic apparatus comprising:
a first chassis comprising a first frame member;
a second chassis adjacent to the first chassis and comprising a second frame member adjacent to the first frame member;
a display supported by the first and second chassis;
a hinge device that connects the first and second chassis to be rotationally movable relative to each other between:
   a first posture in which the first and second chassis overlap in a surface normal direction that is normal to an extending plane of the first and second chassis, and
   a second posture in which the first and second chassis are disposed in a direction which is vertical to the surface normal direction;
a back cover component that:
   extends along:
      a first edge of the first frame member adjacent to the second frame member, and
      a second edge of the second frame member adjacent to the first frame member,
   is configured to close a gap between inner faces of the first and second edges in the first posture, and
   is configured to stride over the first and second edges in the second posture;
a first plate that supports the display on a front face of the first plate and that is fixed to the first edge; and
a second plate that supports the display on a front face of the second plate and that is fixed to the second edge, wherein
the hinge device comprises:
   a first bracket fixed to the first frame member; and
   a second bracket fixed to the second frame member,
a screw that fixes the first frame member to the first plate further fixes the first bracket to the first plate, and
a screw that fixes the second frame member to the second plate further fixes the second bracket to the second plate.

* * * * *